United States Patent
Nagaraja et al.

(10) Patent No.: US 9,955,056 B2
(45) Date of Patent: Apr. 24, 2018

(54) REAL TIME CALIBRATION FOR MULTI-CAMERA WIRELESS DEVICE

(71) Applicant: QUALCOMM Incorporated, San Diego, CA (US)

(72) Inventors: Adarsh Hosaagrahara Nagaraja, San Diego, CA (US); Weiliang Liu, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/659,547

(22) Filed: Mar. 16, 2015

(65) Prior Publication Data

US 2016/0277650 A1    Sep. 22, 2016

(51) Int. Cl.
H04N 5/225 (2006.01)
H04N 5/232 (2006.01)
H04N 5/217 (2011.01)
H04N 17/00 (2006.01)
G06T 7/80 (2017.01)
G06T 7/33 (2017.01)
H04N 101/00 (2006.01)

(52) U.S. Cl.
CPC ............. *H04N 5/2258* (2013.01); *G06T 7/33* (2017.01); *G06T 7/85* (2017.01); *H04N 5/217* (2013.01); *H04N 5/2253* (2013.01); *H04N 5/23212* (2013.01); *H04N 17/002* (2013.01); *G06T 2207/10012* (2013.01); *H04N 2101/00* (2013.01)

(58) Field of Classification Search
None
See application file for complete search history.

(56) References Cited

U.S. PATENT DOCUMENTS

| 6,917,702 | B2 | 7/2005 | Beardsley |
| 7,015,954 | B1* | 3/2006 | Foote ............ G06T 3/4038 348/159 |
| 7,643,067 | B2* | 1/2010 | Jeon ............ G06K 9/03 348/218.1 |
| 8,416,282 | B2 | 4/2013 | Lablans |

(Continued)

FOREIGN PATENT DOCUMENTS

| DE | 102006036933 A1 | 2/2008 |
| EP | 1310091 B1 | 11/2011 |

OTHER PUBLICATIONS

International Search Report and Written Opinion for International Application No. PCT/US2016/016015, ISA/EPO, dated May 4, 2016, 16 pgs.

(Continued)

*Primary Examiner* — Michelle M Entezari
(74) *Attorney, Agent, or Firm* — Toler Law Group. PC

(57) ABSTRACT

A method for generating image calibration data at an electronic device having multiple cameras includes capturing a first image of a first scene at a first time using a first camera at the electronic device. The method also includes capturing a second image of a second scene at the first time using a second camera at the electronic device. A portion of the first scene overlaps a portion of the second scene. The method further includes generating the image calibration data based on the first image and based on the second image.

29 Claims, 4 Drawing Sheets

(56) References Cited

U.S. PATENT DOCUMENTS

| | | | |
|---|---|---|---|
| 9,142,225 B1* | 9/2015 | Chen | G11B 5/5539 |
| 9,479,697 B2* | 10/2016 | Aguilar | H04N 5/23238 |
| 9,602,806 B1* | 3/2017 | Stafford | H04N 13/0059 |
| 2006/0268131 A1 | 11/2006 | Cutler | |
| 2011/0063403 A1* | 3/2011 | Zhang | G06K 9/00261 |
| | | | 348/14.1 |
| 2012/0098958 A1* | 4/2012 | Metzler | B25J 9/1697 |
| | | | 348/95 |
| 2013/0246020 A1* | 9/2013 | Zeng | G06N 7/005 |
| | | | 703/2 |
| 2013/0317741 A1* | 11/2013 | Brashear | G01C 21/165 |
| | | | 701/472 |
| 2014/0180451 A1* | 6/2014 | Marty | G09B 19/0038 |
| | | | 700/91 |
| 2014/0300704 A1* | 10/2014 | Ramaswamy | G06T 7/002 |
| | | | 348/48 |
| 2015/0022677 A1 | 1/2015 | Guo et al. | |
| 2015/0271483 A1* | 9/2015 | Sun | H04N 17/002 |
| | | | 348/187 |
| 2016/0025765 A1* | 1/2016 | Panther | G01B 21/00 |
| | | | 702/150 |
| 2016/0188109 A1* | 6/2016 | Wang | G06F 3/011 |
| | | | 345/173 |
| 2016/0191795 A1* | 6/2016 | Han | G06T 3/4038 |
| | | | 348/36 |

OTHER PUBLICATIONS

Szeliski, Richard, "Image Alignment and Stitching: A Tutorial," Microsoft Research Technical Report, Dec. 10, 2006, Microsoft Corporation, Redmond, WA pp. 1-87.

Cai et al., "Real Time Head Pose Tracking from Multiple Cameras with a Generic Model", IEEE Workshop on Analysis and Modeling of Faces and Gestures in conjunction with CVPR 2010, Jun. 2010, 10 pages.

Galo et al., "Correlation Analysis Between Inner Orientation Parameters of Digital Cameras and Temperature", printed Aug. 21, 2015, 10 pages.

Galo et al., "Correlation Analysis Between Inner Orientation Parameters of Digital Cameras and Temperature", EuroCOW 2012—The European Calibration and Orientation Workshop, Feb. 8-10, 2012, 13 pages, Castelldefels, Spain.

Zhang, "Automatic Computation of a Homography by RANSAC Algorithm", retrieved from https://engineering.purdue.edu/kak/computervision/ECE661.08/homework.htm, Oct. 16, 2008, 36 pages, Purdue University, Indiana, United States.

* cited by examiner

REAL TIME CALIBRATION FOR MULTI-CAMERA WIRELESS DEVICE

I. FIELD

The present disclosure is generally related to image processing.

II. DESCRIPTION OF RELATED ART

Advances in technology have resulted in smaller and more powerful computing devices. For example, a variety of portable personal computing devices, including wireless telephones such as mobile and smart phones, tablets, and laptop computers, are small, lightweight, and easily carried by users. These devices can communicate voice and data packets over wireless networks. Further, many such devices incorporate additional functionalities such as a digital still camera, a digital video camera, a digital recorder, and an audio file player. Also, such devices can process executable instructions, including software applications, such as a web browser application, that can be used to access the Internet. As such, these devices can include significant computing capabilities.

A wireless device may include multiple sensors (e.g., two or more cameras) to capture image frames (e.g., video and/or image stills). As a non-limiting example, a wireless device may include a first sensor (e.g., a left sensor) that is configured to capture a scene from a first angle (e.g., a left angle) and a second sensor (e.g., a right sensor) that is configured to capture the scene from a second angle (e.g., a right angle). Manufacturers of the sensors may provide calibration data to align images captured from the first sensor with images captured from the second sensor. For example, the calibration data may be used to generate an "enhanced" image of the scene based on a first view of the scene captured from the first angle from the first sensor and based on a second view of the scene captured from the second angle from the second sensor. To illustrate, the calibration data may be used to align a first image captured by the first sensor with a second image captured by the second sensor to generate the enhanced image.

However, the calibration data provided by the manufacturers may be susceptible to environmental factors. As a non-limiting example, the calibration data may not accurately reflect the orientation of the first sensor and the second sensor if the wireless device is dropped, causing the orientation of one or both of the sensors to change. As another example, the calibration data may not accurately reflect the orientation of the first sensor and the second sensor if temperature variations or gravitational forces change the orientation of one or both of the sensors. Additionally, during auto focus, the lens of each sensor may move up to three degrees, which may not be considered when using the calibration data provided by the manufacturers. Thus, using the calibration data provided by the manufacturer may degrade the quality of an image that is captured by the first and second sensor if the orientation of the sensors has changed after the calibration data is generated.

III. SUMMARY

Systems and methods for calibrating a multi-camera wireless device in real time are disclosed. A wireless device may include multiple cameras to capture image frames. For example, the wireless device may include a first camera that is configured to capture a scene from a first angle and a second camera that is configured to capture the scene from a second angle. In certain sections below, the "scene" may be expressed as a first scene and a second scene. It should be noted that the first scene and the second scene correspond to a substantially similar physical location that is captured by the first camera and the second camera, respectively. For example, the first scene may correspond to a first physical area, and the second scene may correspond to a nearby second physical area. A portion of the first physical area may "overlap" a portion of the second physical area. For example, a portion of the first physical area may correspond to the same "physical space" as a portion of the second physical area. The wireless device may dynamically generate image calibration data to modify images captured from the first camera with images captured from the second camera to generate enhanced images. As used herein, "modifying" images may include rectifying one or more images, aligning one image with another image, or any other image warping technique to enable additional image processing (e.g., depth map estimation and/or image combination). During calibration, the first camera may capture a first image (e.g., a reference image) of the scene and the second camera may capture a second image of the scene. A processor within the wireless device may down-sample the first image and the second image to generate a first down-sampled image and a second down-sampled image, respectively.

The processor may map one or more feature points in the first down-sampled image to a matrix (e.g., a matrix for homography estimation). For example, the matrix may be a 3×3 matrix used to transform three-dimensional points captured by the first camera to corresponding three-dimensional points captured by the second camera. The feature points may be detected and tracked using methods such as the Harris Corner Detection Algorithm, the Fast Corner Detection Algorithm, the Lucas Kannade Optical Flow Algorithm, etc. Using the matrix, the processor may map one or more corresponding feature points in the second down-sampled image to the one or more feature points in the first down-sampled image. For example, the processor may use the matrix to determine calibration data (e.g., a calibration factor or a homography (H)) that maps a feature point ($X_1$) in the first down-sampled image to a corresponding feature point ($X_2$) in the second down-sampled image (e.g., $X_1 = H*X_2$). The processor may apply the homography (H) to the second down-sampled image to generate a "warped" image. For example, the processor may rotate and/or translate the second down-sampled image based on the homography (H) such that the feature point ($X_1$) will overlap the feature point ($X_2$) when the first down-sampled image and the warped image are combined. Rotating and/or translating the second down-sampled image based on the homography (H) (e.g., based on the calibration data) may enable the processor to perform further processing on one or more of the images. For example, after generating the warped image, the processor may combine the warped image with the first down-sampled image to generate a modified image (e.g., an enhanced image that captures the entire scene). The homography (H) may be iteratively adjusted (e.g., re-estimated) using a calibration algorithm (e.g., a Random Sample Consensus (RANSAC) algorithm) to improve image modification (e.g., maintain image integrity).

Thus, the present disclosure enables "real time" calibration for multiple cameras at a wireless device to maintain image integrity. As a non-limiting example, the wireless device may calibrate (e.g., align) images captured by the first camera with images captured by the second camera based on "real time" calibration data generation at the processor. As used herein, "real time" calibration data generation corresponds to generating calibration data to modify images after the images have been captured by two or more cameras. Thus, the present disclosure enables the wireless device to modify one or more images captured by multiple cameras based on data (e.g., feature points) of the images as opposed to calibration data provided by a manufacturer.

In a particular aspect, a method for generating image calibration data at an electronic device having multiple cameras includes capturing a first image of a first scene at a first time using a first camera and capturing a second image of a second scene at the first time using a second camera. At least a portion of the first scene overlaps a portion of the second scene. The method also includes generating image calibration data based on the first image and based on the second image. The method further includes regenerating image calibration data at the electronic device based on a third image of a third scene captured by the first camera at a second time and based on a fourth image of a fourth scene captured by the second camera at the second time. At least a portion of the third scene overlaps a portion of the fourth scene.

In another particular aspect, an electronic device includes a first camera configured to capture a first image of a first scene at a first time and a second camera configured to capture a second image of a second scene at the first time. At least a portion of the first scene overlaps a portion of the second scene. The electronic device further includes a processor configured to generate image calibration data based on the first image and based on the second image. The processor is further configured to regenerate image calibration data at the electronic device based on a third image of a third scene captured by the first camera at a second time and based on a fourth image of a fourth scene captured by the second camera at the second time. At least a portion of the third scene overlaps a portion of the fourth scene.

In another particular aspect, an electronic device includes means for capturing a first image of a scene at a first time. The electronic device also includes means for capturing a second image of the scene at the first time. The electronic device further includes means for generating image calibration data based on the first image and based on the second image.

In another particular aspect, a non-transitory computer readable medium includes instructions for generating image calibration data at an electronic device having multiple cameras. The instructions are executable to cause a processor to receive a first image of a first scene that is captured by a first camera at a first time. The instructions are further executable to cause the processor to receive a second image of a second scene that is captured by a second camera at the first time. At least a portion of the first scene overlaps a portion of the second scene. The instructions are also executable to cause the processor to generate the image calibration data based on the first image and based on the second image. The instructions are also executable to cause the processor to regenerate image calibration data at the electronic device based on a third image of a third scene captured by the first camera at a second time and based on a fourth image of a fourth scene captured by the second camera at the second time. At least a portion of the third scene overlaps a portion of the fourth scene.

Particular advantages provided by at least one of the disclosed aspects include real time calibration for multiple cameras at an electronic device to maintain image integrity. For example, the electronic device may generate calibration data to calibrate multiple cameras in "real time" to maintain image integrity. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 3:
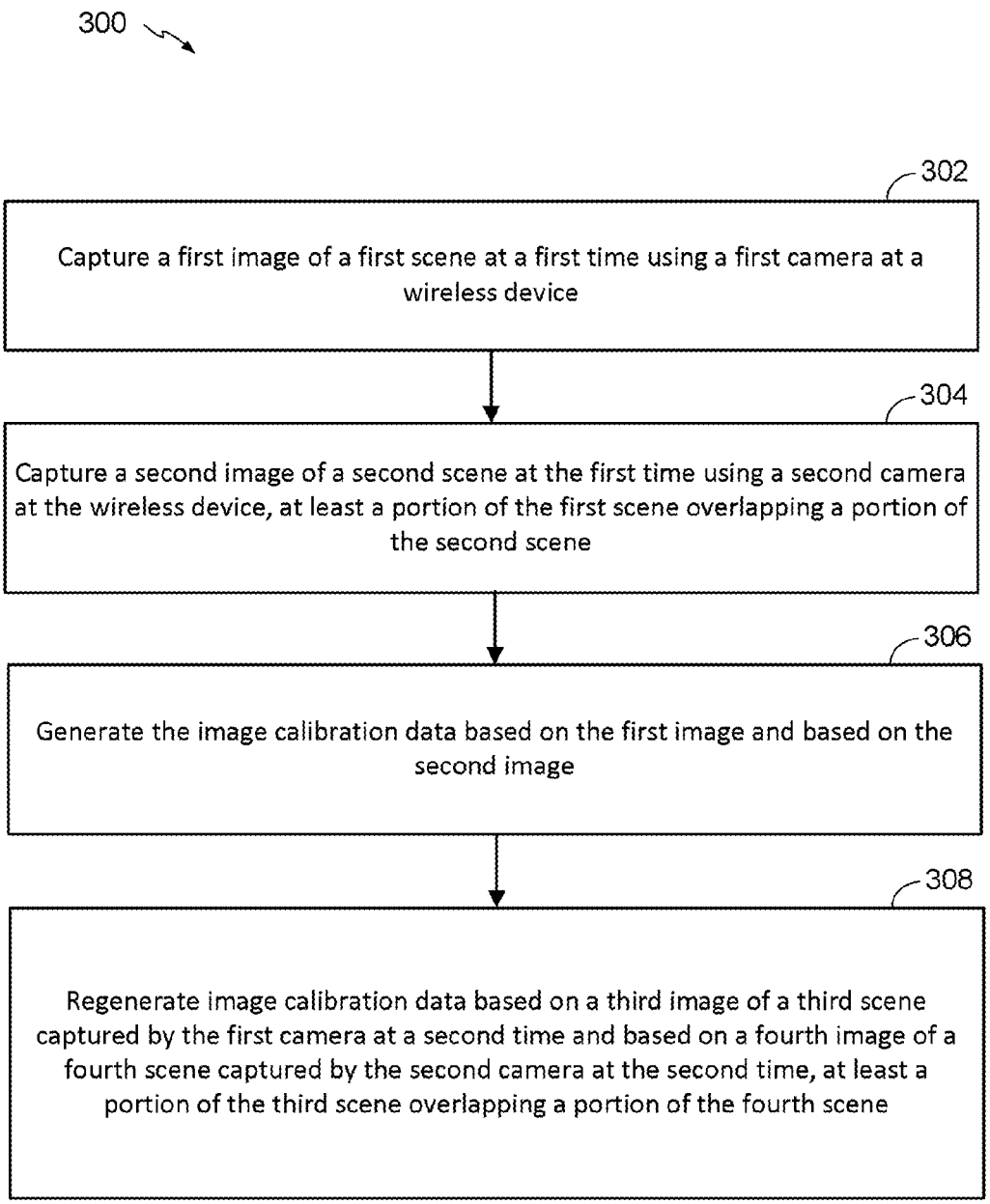
Figure 4:
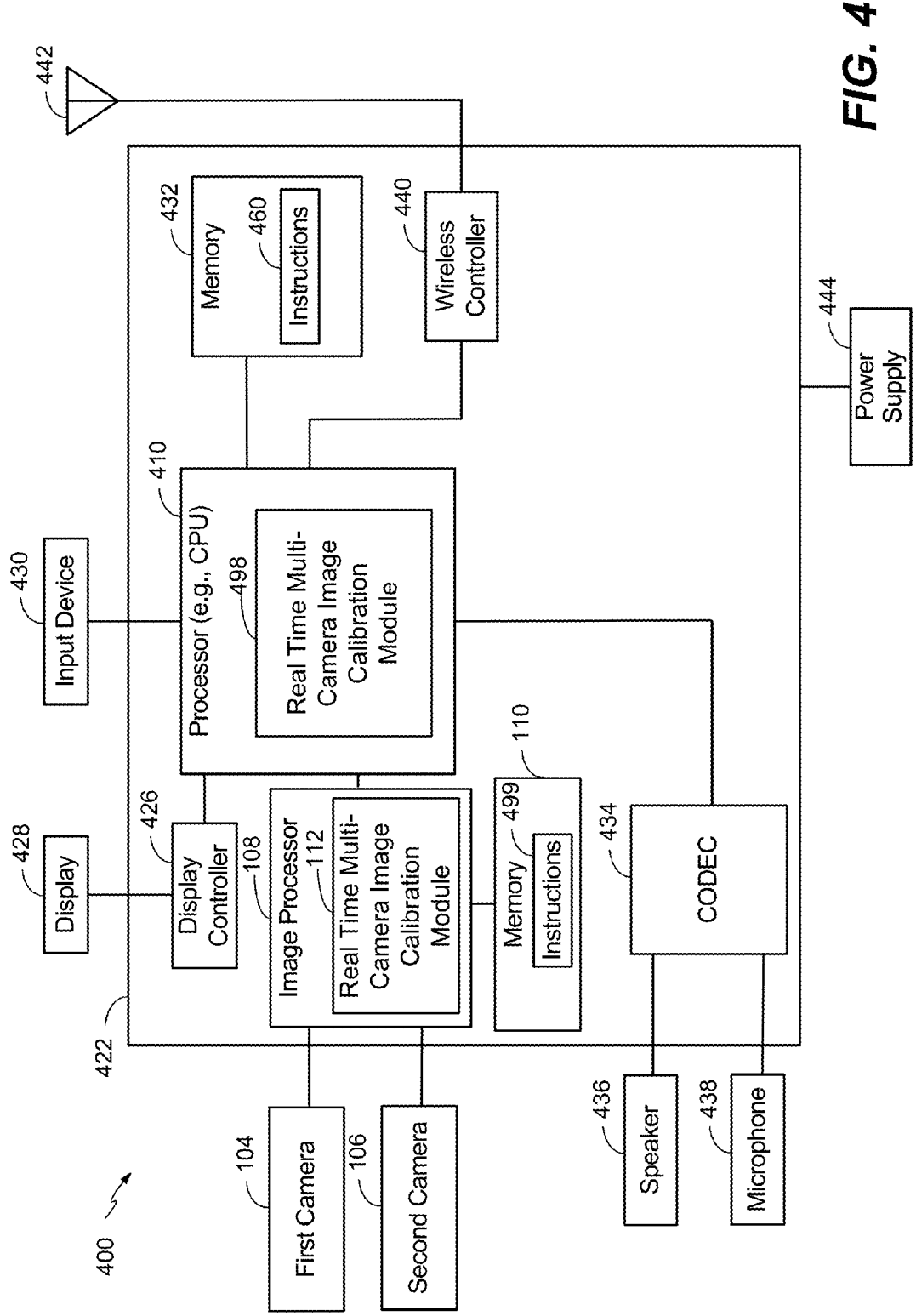

FIG. 3 includes a flowchart to illustrate a particular aspect of a method for generating image calibration data at a wireless device having multiple cameras; and FIG. 4 is a block diagram of a wireless device operable to generate image calibration data based on images captured from multiple cameras.

V. DETAILED DESCRIPTION

Figure 1:
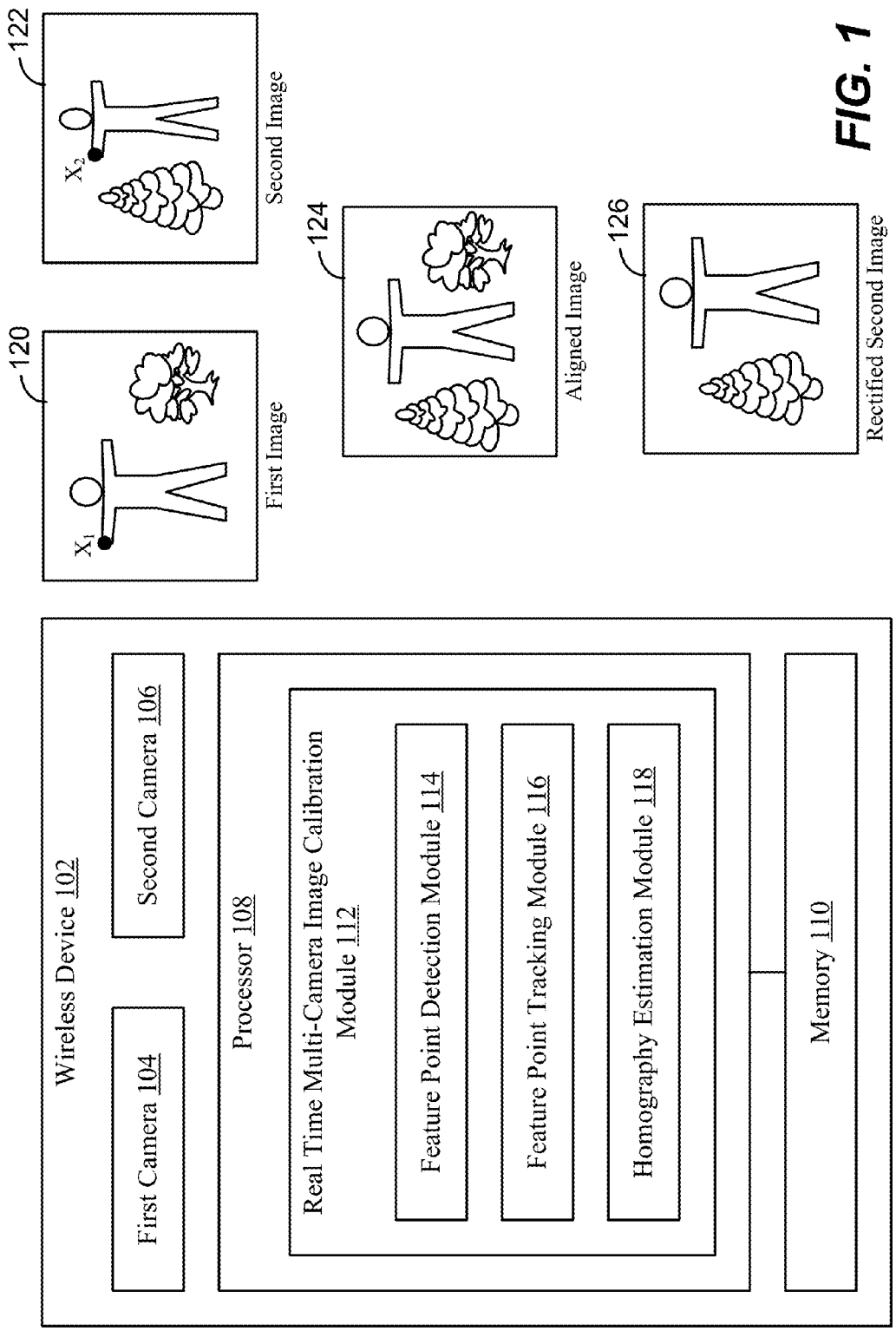
FIG. 1 illustrates a wireless device that is operable to generate image calibration data in real time to modify one or more images captured by multiple cameras.

Referring to FIG. 1, a particular aspect of a wireless device 102 is shown. The wireless device 102 is operable to generate image calibration data in real time based on images captured by multiple cameras and to modify one or more of the images captured by one or more of the cameras. The wireless device 102 includes a first camera 104, a second camera 106, a processor 108 (e.g., an image processor), and a memory 110.

The first camera 104 may be configured to capture a first image 120 of a scene at a first time. As used herein, the "first time" may be a time period spanning a couple of nanoseconds and is not limited to a particular instance in time. As a non-limiting example, the first camera 104 may be a left image sensor that is configured to capture the scene from a left angle. In the illustrative example, the scene depicts a human with outstretched arms, a tree on the left side of the human, and a tree on the right side of the human. However, the first image 120 may not be able to capture the entire scene (e.g., the tree on the left side of the human may be missing). The second camera 106 may be configured to capture a second image 122 of the scene at the first time (e.g., at the same time that the first camera 104 captures the first image 120). As a non-limiting example, the second camera 106 may be a right image sensor that is configured to capture the scene from a right angle. The second image 122 may not be able to capture the entire scene (e.g., the tree on the right side of the human may be missing).

As described below, the processor 108 may be configured to generate image calibration data based on the first image 120 and based on the second image 122. As further described below, the image calibration data may be used to modify images captured by the cameras 104, 106. As a non-limiting example, the image calibration data may include image alignment data that is used to align images captured by the first camera 104 with images captured by the second camera 106 to generate aligned images (e.g., "enhanced" images that capture the entire scene). As another non-limiting example, the image calibration data may include image rectification data that is used to rectify an image captured by the second camera 106 (or the first camera 104) to generate a rectified image. The image calibration data may reflect an orientation of the first camera 104 with respect to an orientation of the second camera 106 in "real time." For example, the image calibration data may change if the orientation of the first camera 104 and/or the orientation of the second camera 106 changes. To illustrate, the processor 108 may include a real time multi-camera image calibration module 112. As described below, the real time multi-camera image calibration module 112 may use feature points of the first image 120 and corresponding feature points of the second image 122 to generate an aligned image 124 (e.g., an image that is generated by aligning feature points in the first image 120 with corresponding feature points in the second image 122). Additionally, or in the alternative, the real time multi-camera image calibration module 112 may use feature points of the first image 120 and corresponding feature points of the second image 122 to generate a rectified second image 126 (e.g., a rectified version of the second image 122 based on properties of the first image 120). The real time multi-camera image calibration module 112 includes a feature point detection module 114, a feature point tracking module 116, and a homography estimation module 118.

The feature point detection module 114 may be configured to detect one or more feature points from the first image 120 and one or more corresponding feature points from the second image 122. For example, after image capture, the first image 120 and the second image 122 may be provided to the real time multi-camera image calibration module 112. The feature point detection module 114 may use a Harris Corner detection algorithm, a Features from Accelerated Segment Test (FAST) Corner detection algorithm, a Scale-Invariant Feature Transform (SIFT) detection algorithm, a Speeded Up Robust Features (SURF) detection algorithm, a FAST-9 detection algorithm, etc., to detect feature points in the first image 120 and to detect corresponding feature points in the second image 122. As used herein, a feature point in the first image 120 corresponds to a point in the first image 120 indicating a physical location of the scene, and a corresponding feature point in the second image 122 corresponds to a point in the second image 122 indicating the same physical location of the scene.

The feature point tracking module 116 may be configured to track feature points in images captured by the first camera 104 (e.g., the first image 120) and to track features points in images captured by the second camera 106 (e.g., the second image 122). As a non-limiting example, the first camera 104 and the second camera 106 may capture video (e.g., a sequence of image frames) and the feature point tracking module 116 may track feature points (on a frame-by-frame basis) in video captured by the first camera 104 and in video captured by the second camera 106. The feature point tracking module 116 may use a Lucas-Kanade Optical Flow algorithm, a Pyramidal Lucas-Kanade algorithm, a Horn-Schunck algorithm, a Black-Jepson algorithm, etc., to track feature points in frames captured by the first camera 104 and to track feature points in frames captured by the second camera 106.

The homography estimation module 118 may be configured to estimate a homography (H) between the first image 120 and the second image 122. As used herein, a homography includes a bijection that maps lines (or feature points) in one image to corresponding lines (or corresponding feature points) in another image. The homography (H) between the first image 120 and the second image 122 may be based on the tracked feature points in the first image 120 and the corresponding feature points in the second image 122. For example, the homography estimation module 118 may use a Random Sample Consensus (RANSAC) algorithm, or another iterative method, to estimate the homography (H) between the first image 120 and the second image 122. As a non-limiting example, the homography estimation module 118 may map one or more feature points in the first image 120 (or a down-sampled version of the first image 120) to a matrix (e.g., a matrix for homography estimation).

Using the matrix, the real time multi-camera image calibration module 112 may map one or more corresponding feature points in the second image 122 (or a down-sampled version of the second image 122) to the one or more feature points in the first image 120. The homography estimation module 118 may use the matrix to determine calibration data (e.g., a calibration factor or the homography (H)) that maps a feature point ($X_1$) in the first image 120 to a corresponding feature point ($X_2$) in the second image 122 such that $X_1 = H \ast X_2$. The homography (H) may be iteratively adjusted using the RANSAC algorithm to improve mapping between corresponding feature points.

The processor 108 may be configured to apply the homography (H) to the second image 122 to generate a "warped" image. As a non-limiting example, the processor 108 may adjust (e.g., realign) the second image 122 based on the homography (H) to improve alignment between the first image 120 and the second image 122. For example, the processor 108 may rotate and/or translate the second image 122 such that the feature point ($X_1$) overlaps the feature point ($X_2$) when the images 120, 122 are combined. The first image 120 and the warped image may be combined to generate the aligned image 124. For example, the homography (H) includes rotation and translation information between the images 120, 122. The warped image may be generated by fetching pixels from the location directed by the homography (H) and by applying a smoothening filter (e.g., a bi-linear interpolation).

Additionally, or in the alternative, the processor 108 may rectify the second image 122 based on the homography (H) generate the rectified second image 126. For example, the processor 108 may rotate, translate, and/or perform any other image modification operation on the second image 122 based on feature points in the images 120, 122. In the illustrative example of FIG. 1, the processor 108 may modify the second image 122 such that the person in the second image 122 has a "width" (or area size) in the rectified second image 126 that is substantially similar to the width of the person in the first image 120.

According to the above described techniques, the processor 108 may also be configured to generate image calibration data (e.g., an additional homography (H)) based on feature points of additional images captured by the first camera 104 and based on feature points of additional images captured by the second camera 106. The processor 108 may generate (or regenerate) image calibration data upon user initiation of an image capture at the wireless device 102, after a particular time period, in response to detecting a change in orientation of the first camera 104, or in response to detecting a change in orientation of the second camera 106. Regenerating the image calibration data may compensate (e.g., provide further image alignment adjustments) for orientation changes of the cameras 104, 106. For example, the homography (H) between images captured by the first camera 104 and images captured by the second camera 106 may change if the orientation of at least one of the cameras 104, 106 changes. Regenerating the image calibration data based on mapping feature points between images captured by the cameras 104, 106 may compensate for the change in orientation.

Thus, the processor 108 may generate (and regenerate) image calibration data that is usable for an image modification operation applied to an output of the first camera 104 (e.g., the first image 120), an output of the second camera 106 (e.g., the second image 122), or any combination thereof. Although the image modification operations described above illustrate image alignment operations (e.g., generation of the aligned image 124) and image rectification operations (e.g., generation of the rectified second image 126), in other aspects, the image modification operations may include any image warping operation that enables additional image processing. For example, image modification operation may include any warping operation that enables depth map estimation for three-dimensional image processing, image combination, etc.

The wireless device 102 of FIG. 1 may provide real time calibration for the cameras 104, 106 to maintain image integrity (e.g., accurately align images from the cameras 104, 106 to generate the aligned image 124 and/or rectify the second image 122 based on properties of the first image 120 to generate the rectified second image 126). For example, the real time multi-camera image calibration module 112 may determine calibration data to modify images captured by the first camera 104 and images captured by the second camera 106. Determining the calibration data in "real time" using the real time multi-camera image calibration module 112 may reduce dependency on calibration data provided by manufacturers of the cameras 104, 106. For example, the calibration data provided by the manufacturers may be susceptible to environmental factors (e.g., temperature changes, gravitational forces, physical damages caused by dropping the wireless device 102, etc.) that may cause the orientation of the cameras 104, 106 to change.

Thus, the real time multi-camera image calibration module 112 may provide calibration (or recalibration) for the cameras 104, 106 after the orientation of the cameras 104, 106 has changed due to environmental factors. For example, the real time multi-camera image calibration module 112 may provide calibration (e.g., determine calibration data) each time the cameras 104, 106 capture images (e.g., upon user initiation of an image capture), upon user demand, after a certain interval of time (e.g., every day, every 10 days, every 20 days, every 30 days, etc.), if the wireless device detects some change in camera orientation, independent of sensor data, every time a camera application is launched, or any combination thereof. In a particular aspect, the wireless device 102 may be configured to detect a change in orientation of the first camera 104 and/or a change in orientation of the second camera 106. Upon detecting the change, the real time multi-camera image calibration module 112 may generate calibration data according to the above-described techniques. Thus, the real time multi-camera image calibration module 112 may provide real time calibration to enable further processing (e.g., alignment, combination, depth map generation) of images captured by the cameras 104, 106.

Figure 2:
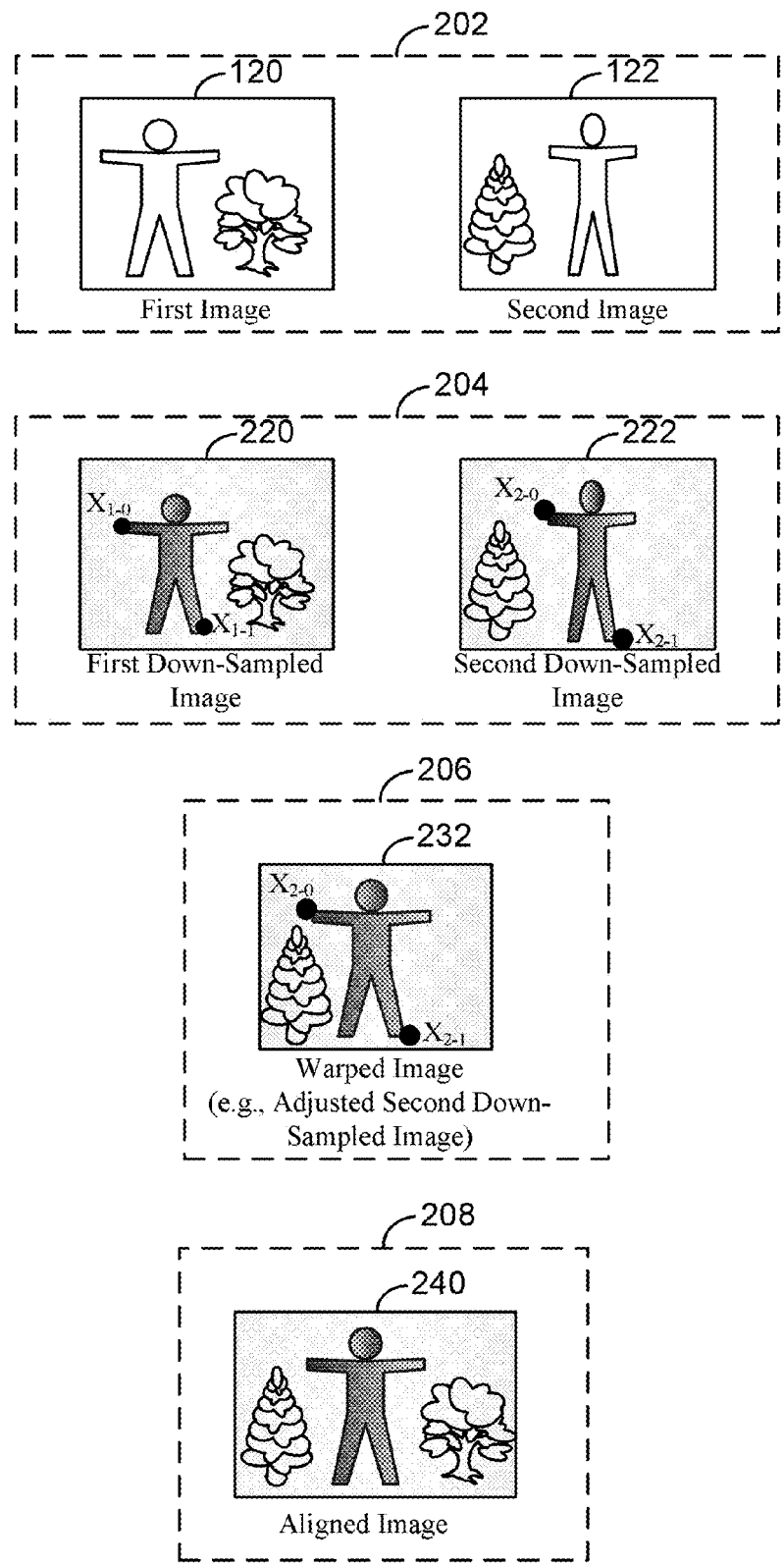
FIG. 2 illustrates a process for generating image calibration data in real time to modify one or more images captured by multiple cameras.

FIG. 2 depicts a particular illustrative aspect of a process for generating image calibration data in real time to modify images captured by one or more cameras of a set of cameras. At a first stage 202, the first image 120 and the second image 122 may be captured. For example, the first camera 104 may capture the first image 120 of the scene at a first time, and the second camera 106 may capture the second image 122 of the scene at the first time (e.g., at the same time that the first camera 104 captures the first image 120).

During a second stage 204, the first image 120 may be down-sampled to generate a first down-sampled image 220, and the second image 122 may be down-sampled to generate a second down-sampled image 222. For example, after the cameras 104, 106 capture the first and second images 120, 122, respectively, the first and second images 120, 122 may be provided to the processor 108. The processor 108 may down-sample the first and second images 120, 122 to generate the first and second down-sampled images 220, 222, respectively. For example, the first and second images 120, 122 may have a relatively high resolution (e.g., a relatively high pixel count). As non-limiting examples, the images 120, 122 may be five megapixel images, eight megapixel images, ten megapixel images, etc. Down-sampling the images 120, 122 may reduce the resolution of the images (e.g., reduce the resolution to one megapixel).

During the second stage 204, a feature point $(X_{1-0})$ may be detected in the first down-sampled image 220 and a corresponding feature point $(X_{2-0})$ may be detected in the second down-sampled image 222. Additionally, another feature point $(X_{1-1})$ may be detected in the first down-sampled image 220 and another corresponding feature point $(X_{2-1})$ may be detected in the second down-sampled image 222. For example, the feature point detection module 114 may detect the feature points in the down-sampled images 220, 222 using the Harris Corner detection algorithm, the FAST Corner detection algorithm, the SIFT detection algorithm, the SURF detection algorithm, or the FAST-9 detection algorithm. As used herein, a feature point in the first down-sampled image 220 corresponds to a point in the first down-sampled image 220 indicating a physical location of the scene, and a corresponding feature point in the second down-sampled image 222 corresponds to a point in the second down-sampled image 222 indicating the same physical location of the scene.

In a particular aspect, the feature point tracking module 116 may track the feature points on a frame-by-frame basis. For example, the feature point tracking module 116 may use the Lucas-Kanade Optical Flow algorithm, the Pyramidal Lucas-Kanade algorithm, the Horn-Schunck algorithm, or the Black-Jepson algorithm to track feature points (from frame-to-frame) in down-sampled frames captured by the first camera 104 and to track feature points in down-sampled frames captured by the second camera 106.

During a third stage 206, a warped image 232 may be generated. For example, the homography estimation module 118 may estimate a homography (H) between the first down-sampled image 220 and the second down-sampled image 222. The homography (H) between the first down-sampled image 220 and the second down-sampled image 222 may be based on the tracked feature points $(X_{1-0}, X_{1-1})$ in the first down-sampled image 220 and the corresponding feature points $(X_{2-0}, X_{2-1})$ in the second down-sampled image 222. For example, the homography estimation module 118 may use the RANSAC algorithm, or another iterative method, to estimate the homography (H) between the first down-sampled image 220 and the second down-sampled image 222. As a non-limiting example, the homography estimation module 118 may map one or more feature points in first down-sampled image 220 to the matrix. Using the matrix, the real time multi-camera image calibration module 112 may map one or more corresponding feature points in the second down-sampled image 222 to the one or more feature points in the first down-sampled image 220. For example, the matrix includes the homography (H). Feature point detection and matching using the RANSAC algorithm may be used to determine the homography matrix.

The homography estimation module 118 may use the matrix to determine the homography (H) that maps the feature points $(X_{1-0}, X_{1-1})$ in the first down-sampled image 220 to corresponding feature points $(X_{2-0}, X_{2-1})$ in the second down-sampled image 222 such that $X_{1-0}=H*X_{2-0}$ and $X_{1-1}=H*X_{2-1}$. The homography (H) may be iteratively adjusted using the RANSAC algorithm to improve mapping between corresponding feature points. The processor 108 may be configured to apply the homography (H) to the second down-sampled image 222 to generate the warped image 232 (e.g., an adjusted second down-sampled image). To generate the warped image 232, the second down-sampled image 222 may undergo a translation, a rotation, or any combination thereof.

During a fourth stage 208, an aligned image 240 may be generated. The aligned image 240 may be generated by combining the first down-sampled image 220 with the warped image 232 (e.g., the adjusted second down-sampled image 222) such that the feature point ($X_{1-0}$) overlaps the feature point ($X_{2-0}$) and such that the feature point ($X_{1-1}$) overlaps the feature point ($X_{2-1}$).

The process described with respect to FIG. 2 may provide real time calibration that may be used to align images 120, 122 captured by multiple cameras. For example, the homography (H) (e.g., calibration data) may be determined after the images 120, 122 are captured (e.g., in "real time") as opposed to a homography (H) that is based on calibration data provided by a manufacturer. Thus, determining the homography (H) (e.g., calibration data) in "real time" using the real time multi-camera image calibration module 112 may reduce dependency on calibration data provided by manufacturers of the cameras. The homography estimation and the warped image 232 may be generated in a relatively short time period. For example, it will be appreciated that the homography estimation and warp image generation may be performed in less than 50 milliseconds.

Referring to FIG. 3, a flowchart that illustrates a particular aspect of a method 300 for generating image calibration data at a wireless device having multiple cameras is shown. As an example, the method 300 may be performed by the wireless device 102 of FIG. 1.

The method 300 includes capturing a first image of a first scene at a first time using a first camera at a wireless device, at 302. For example, referring to FIG. 1, the first camera 104 may capture the first image 120 of the scene at the first time. The first camera 104 may be a left image sensor that captures the scene from a left angle. A second image of a second scene may be captured at the first time using a second camera at the wireless device, at 304. For example, referring to FIG. 1, the second camera 106 may capture the second image 122 of the scene at the first time (e.g., at the same time that the first camera 104 captures the first image 120). The second camera 106 may be a right image sensor that is configured to capture the scene from a right angle.

Image calibration data may be generated based on the first image and based on the second image, at 306. In a particular aspect, the image calibration data may be used to align images captured by the first camera with images captured by the second camera. For example, referring to FIG. 2, the first image 120 may be down-sampled to generate the first down-sampled image 220, and the second image 122 may be down-sampled to generate the second down-sampled image 222. The feature point ($X_{1-0}$) may be detected in the first down-sampled image 220 and the corresponding feature point ($X_{2-0}$) may be detected in the second down-sampled image 222. The feature point ($X_{1-0}$) in the first down-sampled image 220 may be mapped to the feature point ($X_{2-0}$) in the second down-sampled image 222. The homography estimation module 118 may estimate the homography (H) (e.g., the calibration data) that maps the feature point ($X_{1-0}$) in the first down-sampled image 220 to the corresponding feature points ($X_{2-0}$) in the second down-sampled image 222 such that $X_{1-0}=H*X_{2-0}$. The homography (H) may be iteratively adjusted using the RANSAC algorithm to improve mapping between corresponding feature points.

Image calibration data may be regenerated based on a third image of a third scene captured by the first camera at a second time and based on a fourth image of a fourth scene captured by the second camera at the second time, at 308. For example, referring to FIG. 1, the processor 108 may be configured to regenerate image calibration data (e.g., an additional homography (H)) based on additional images captured by the first camera 104 and additional images captured by the second camera 106. For example, the processor 108 may regenerate image calibration data upon user initiation of an image capture at the wireless device 102, after a particular time period, in response to detecting a change in orientation of the first camera 104, or in response to detecting a change in orientation of the second camera 106. Regenerating the image calibration data may compensate (e.g., provide further image alignment adjustments) for orientation changes of the cameras 104, 106. For example, the homography (H) between images captured by the first camera 104 and images captured by the second camera 106 may change if the orientation of at least one of the cameras 104, 106 change. Regenerating the image calibration data based on mapping feature points between images captured by the cameras 104, 106 may compensate for the change in orientation. The regenerated image calibration data may be used to rectify images from one or more of the cameras 104, 106 and/or to warp (or otherwise modify) images from one or more of the cameras 104, 106. Such rectified, warped, and/or modified images may be used to generate the aligned image 240 or a depth map, as illustrative non-limiting examples.

In a particular aspect, the method 300 may include generating a warped image based on the calibration data. For example, the processor 108 may apply the homography (H) to the second down-sampled image 222 to generate the warped image 232 (e.g., an adjusted second down-sampled image). To generate the warped image, the second down-sampled image 222 may undergo a translation, a rotation, or any combination thereof.

In a particular aspect, the method 300 may include generating an aligned image. For example, referring to FIG. 2, the aligned image 240 may be generated by combining the first down-sampled image 220 with the warped image 232 (e.g., the adjusted second down-sampled image 222) such that the feature point ($X_{1-0}$) overlaps the feature point ($X_{2-0}$).

The method 300 of FIG. 3 may provide real time calibration for the cameras 104, 106 to maintain image integrity. For example, the real time multi-camera image calibration module 112 may determine calibration data to modify images captured by the first camera 104 and/or images captured by the second camera 106. Determining the calibration data in "real time" using the real time multi-camera image calibration module 112 may reduce dependency on calibration data provided by manufacturers of the cameras 104, 106. For example, the calibration data provided by the manufacturers may be susceptible to environmental factors (e.g., temperature changes, gravitational forces, physical damages caused by dropping the wireless device 102, etc.) that may cause the orientation of the cameras 104, 106 to change.

The real time multi-camera image calibration module 112 may provide calibration (or recalibration) for the cameras 104, 106 after the orientation of the cameras 104, 106 has changed due to environmental factors. For example, the real time multi-camera image calibration module 112 may provide calibration (e.g., determine calibration data) each time the cameras 104, 106 capture images, upon user demand, after a certain interval of time (e.g., every day, every 10 days, every 20 days, every 30 days, etc.), or any combination thereof. Thus, the real time multi-camera image calibration module 112 may provide real time calibration to modify images captured by one or more of the cameras 104, 106.

Referring to FIG. 4, a block diagram of another particular illustrative aspect of an electronic device 400 is shown. In a particular aspect, the electronic device 400 may be a wireless device. For example, the electronic device 400 may correspond to the wireless device 102 of FIG. 1. The electronic device 400 includes a processor 410 (e.g., a central processing unit (CPU)) coupled to a memory 432. The processor 108 of FIG. 1 (e.g., the image processor) is coupled to the processor 410.

The first camera 104 and the second camera 106 may be coupled to the image processor 108. The first camera 104 may be configured to capture the first image 120 of the scene, and the second camera 106 may be configured to capture the second image 122 of the scene. The image processor 108 may include the real time multi-camera image calibration module 112. The real time multi-camera image calibration module 112 may be configured to determine calibration data (e.g., the homography (H) between the first and second images 120, 122) and to modify one or more of the first and second images according to the techniques described with respect to FIGS. 1-3. The memory 110 may be coupled to the image processor 108. The memory 110 may be a non-transitory computer-readable medium that includes instructions 499 executable by the image processor 108 to perform the method 300 of FIG. 3.

The memory 432 may be also non-transitory computer-readable medium that includes instructions 460 executable by the processor 410. For example, the processor 410 may also include a real time multi-camera image calibration module 498. The real time multi-camera image calibration module 498 may be configured to operate in a substantially similar manner as the real time multi-camera image calibration module 112 in the image processor 108. The processor-executable instructions 410 may cause the processor 410 to perform the method 300 of FIG. 3. As used herein, a "non-transitory computer-readable medium" may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM).

FIG. 4 also shows a display controller 426 that is coupled to the processor 410 and to a display 428. A coder/decoder (CODEC) 434 is coupled to the processor 410. A speaker 436 can be coupled to the CODEC 434, and a microphone 438 can be coupled to the CODEC 434. FIG. 4 also indicates that a wireless controller 440 can be coupled to the processor 410 and to an antenna 442. In a particular aspect, the processor 410, the image processor 108, the display controller 426, the memory 432, the CODEC 434, and the wireless controller 440 are included in a system-in-package or system-on-chip device 422. In a particular aspect, an input device 430, such as a touchscreen and/or keypad, and a power supply 444 are coupled to the system-on-chip device 422. Moreover, in a particular aspect, as illustrated in FIG. 4, the display 428, the input device 430, the speaker 436, the microphone 438, the antenna 442, the power supply 444, the first camera 104, and the second camera 106 are external to the system-on-chip device 422. However, each of the display 428, the input device 430, the speaker 436, the microphone 438, the antenna 442, the power supply 444, the first camera 104, and the second camera 106 can be coupled to a component of the system-on-chip device 422, such as an interface or a controller.

In conjunction with the described aspects, an electronic device includes means for capturing a first image of a scene at a first time. For example, the means for capturing the first image may include the first camera 104 of FIGS. 1 and 4, one or more other devices, modules, or any combination thereof.

The electronic device may also include means for capturing a second image of the scene at the first time. For example, the means for capturing the second image may include the second camera 106 of FIGS. 1 and 4, one or more other devices, modules, or any combination thereof.

The electronic device may also include means for generating image calibration data based on the first image and based on the second image. For example, the means for generating the image calibration data may include the processor 108 of FIGS. 1 and 4, the real time multi-camera image calibration module 112 of FIGS. 1 and 4, the feature point detection module 114 of FIG. 1, the feature point tracking module 116 of FIG. 1, the homography estimation module 118 of FIG. 1, the processor 410 of FIG. 4, the real time multi-camera image calibration module 498 of FIG. 4, a processor executing instructions at a non-transitory computer readable storage medium, or any combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for generating image calibration data at an electronic device having multiple cameras, the method comprising:
   capturing a first image of a first scene at a first time using a first camera at the electronic device;
   capturing a second image of a second scene at the first time using a second camera at the electronic device, at least a portion of the first scene overlapping a portion of the second scene;
   generating image calibration data based on the first image and based on the second image, the image calibration data used to align images captured by the first camera with images captured by the second camera;
   detecting a first change in orientation of the first camera or a second change in orientation of the second camera, the first change in orientation detected in response to a temperature change and a detected force applied to the first camera, and the second change detected in response to the temperature change and a detected force applied to the second camera; and
   in response to detecting the first change in orientation or in response to detecting the second change in orientation, regenerating image calibration data at the electronic device based on a third image of a third scene captured by the first camera at a second time and based on a fourth image of a fourth scene captured by the second camera at the second time, at least a portion of the third scene overlapping a portion of the fourth scene, the regenerated image calibration data used to align images captured by the first camera with images captured by the second camera.

2. The method of claim 1, wherein the image calibration data includes image alignment data.

3. The method of claim 1, wherein image calibration data is further regenerated upon user initiation of an image capture at the electronic device.

4. The method of claim 1, wherein image calibration data is further regenerated after a particular period of time.

5. The method of claim 1, wherein regenerating the image calibration data compensates for the change in orientation of the first camera.

6. The method of claim 1, wherein regenerating image calibration data compensates for the change in orientation of the second camera.

7. The method of claim 1, wherein generating the image calibration data includes estimating a homography between the first image and the second image, the homography used to align the first image with the second image.

8. The method of claim 7, wherein the homography is estimated using a Random Sample Consensus (RANSAC) algorithm.

9. The method of claim 1, wherein generating the image calibration data comprises:
   down-sampling the first image to generate a first down-sampled image;
   down-sampling the second image to generate a second down-sampled image; and
   determining a homography to map a first feature point in the first down-sampled image to a second feature point in the second down-sampled image, wherein the first feature point and the second feature point correspond to the same location in the scene, and wherein the image calibration data includes the homography.

10. The method of claim 9, wherein the first feature point and the second feature point are detected using a Harris Corner detection algorithm, a Features from Accelerated Segment Test (FAST) Corner detection algorithm, a Scale-Invariant Feature Transform (SIFT) detection algorithm, a Speeded Up Robust Features (SURF) detection algorithm, or a FAST-9 detection algorithm.

11. The method of claim 9, wherein the first feature point and the second feature point are tracked using a Lucas-Kanade Optical Flow algorithm, a Pyramidal Lucas-Kanade algorithm, a Horn-Schunck algorithm, or a Black-Jepson algorithm.

12. The method of claim 9, further comprising:
   adjusting the second down-sampled image based on the homography to generate a warped image; and
   combining the first down-sampled image with the warped image to generate an aligned image.

13. The method of claim 12, wherein adjusting the second down-sampled image includes rotating the second down-sampled image, translating the second down-sampled image, or any combination thereof.

14. The method of claim 1, wherein the portion of the first scene and the portion of the second scene depict a common physical area.

15. An electronic device comprising:
   a first camera configured to capture a first image of a first scene at a first time;
   a second camera configured to capture a second image of a second scene at the first time, at least a portion of the first scene overlapping a portion of the second scene; and
   a processor configured to:
      generate image calibration data based on the first image and based on the second image, the image calibration data used to align images captured by the first camera with images captured by the second camera;
      detect a first change in orientation of the first camera or a second change in orientation of the second camera, the first change in orientation detected in response to a temperature change and a detected force applied to the first camera, and the second change detected in response to the temperature change and a detected force applied to the second camera; and
      in response to detecting the first change in orientation or in response to detecting the second change in orientation, regenerate image calibration data based on a third image of a third scene captured by the first camera at a second time and based on a fourth image of a fourth scene captured by the second camera at the second time, at least a portion of the third scene overlapping a portion of the fourth scene, the regenerated image calibration data used to align images captured by the first camera with images captured by the second camera.

16. The electronic device of claim 15, wherein the image calibration data includes image alignment data.

17. The electronic device of claim 15, wherein image calibration data is further regenerated upon user initiation of an image capture at the electronic device.

18. The electronic device of claim 15, wherein image calibration data is further regenerated after a particular period of time.

19. The electronic device of claim 15, wherein the processor is further configured to estimate a homography between the first image and the second image.

20. The electronic device of claim 19, wherein the homography is estimated using a Random Sample Consensus (RANSAC) algorithm.

21. The electronic device of claim 15, wherein the processor is configured to:
down-sample the first image to generate a first down-sampled image;
down-sample the second image to generate a second down-sampled image;
determine a homography to map a first feature point in the first down-sampled image to a second feature point in the second down-sampled image, wherein the first feature point and the second feature point correspond to the same location in the scene, and wherein the image calibration data includes the homography.

22. The electronic device of claim 21, wherein the first feature point and the second feature point are detected using a Harris Corner detection algorithm, a Features from Accelerated Segment Test (FAST) Corner detection algorithm, a Scale-Invariant Feature Transform (SIFT) detection algorithm, a Speeded Up Robust Features (SURF) detection algorithm, or a FAST-9 detection algorithm.

23. The electronic device of claim 21, wherein the first feature point and the second feature point are tracked using a Lucas-Kanade Optical Flow algorithm, a Pyramidal Lucas-Kanade algorithm, a Horn-Schunck algorithm, or a Black-Jepson algorithm.

24. The electronic device of claim 21, wherein the processor is configured to:
adjust the second down-sampled image based on the homography to generate a warped image; and
combine the first down-sampled image with the warped image to generate an aligned image.

25. The electronic device of claim 24, wherein adjusting the second down-sampled image includes rotating the second down-sampled image, translating the second down-sampled image, or any combination thereof.

26. A non-transitory computer readable medium comprising instructions for generating image calibration data at an electronic device having multiple cameras, the instructions, when executed by a processor, cause the processor to:
receive a first image of a first scene that is captured by a first camera at a first time;
receive a second image of a second scene that is captured by a second camera at the first time, at least a portion of the first scene overlapping a portion of the second scene;
generate the image calibration data based on the first image and based on the second image, the image calibration data used to align images captured by the first camera with images captured by the second camera;
detect a first change in orientation of the first camera or a second change in orientation of the second camera, the first change in orientation detected in response to a temperature change and a detected force applied to the first camera, and the second change detected in response to the temperature change and a detected force applied to the second camera; and
in response to detecting the first change in orientation or in response to detecting the second change in orientation, regenerate image calibration data at the electronic device based on a third image of a third scene captured by the first camera at a second time and based on a fourth image of a fourth scene captured by the second camera at the second time, at least a portion of the third scene overlapping a portion of the fourth scene, the regenerated image calibration data used to align images captured by the first camera with images captured by the second camera.

27. The non-transitory computer readable medium of claim 26, wherein image calibration data is further regenerated upon user initiation of an image capture at the electronic device.

28. An electronic device comprising:
means for capturing a first image of a first scene at a first time;
means for capturing a second image of a scene at the first time, at least a portion of the first scene overlapping a portion of the second scene;
means for detecting a first change in orientation of the means for capturing the first image or a second change in orientation of the means for capturing the second image, the first change in orientation detected in response to a temperature change and a detected force applied to the means for capturing the first image, and the second change detected in response to the temperature change and a detected force applied to the means for capturing the second image; and
means for generating image calibration data based on the first image and based on the second image, the image calibration data used to align images captured by the means for capturing the first image with images captured by the means for capturing the second image, wherein calibration data is regenerated in response to detecting the first change in orientation or in response to detecting the second change in orientation.

29. The electronic device of claim 28, wherein image calibration data is further regenerated upon user initiation of an image capture at the electronic device.

* * * * *